(12) United States Patent
Rácz et al.

(10) Patent No.: US 9,319,323 B2
(45) Date of Patent: Apr. 19, 2016

(54) OPTIMISED PACKET DELIVERY ACROSS A TRANSPORT NETWORK

(75) Inventors: Sándor Rácz, Cegléd (HU); Balázs Gerö, Budapest, HI (US); János Harmatos, Budapest (HU); Szilveszter Nàdas, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 14/350,109

(22) PCT Filed: Oct. 14, 2011

(86) PCT No.: PCT/EP2011/068025
§ 371 (c)(1),
(2), (4) Date: May 14, 2014

(87) PCT Pub. No.: WO2013/053405
PCT Pub. Date: Apr. 18, 2013

(65) Prior Publication Data
US 2014/0321284 A1    Oct. 30, 2014

(51) Int. Cl.
H04L 12/819    (2013.01)
H04W 28/02    (2009.01)
H04L 12/833    (2013.01)

(52) U.S. Cl.
CPC ............. *H04L 47/215* (2013.01); *H04L 47/31* (2013.01); *H04W 28/0257* (2013.01)

(58) Field of Classification Search
None
See application file for complete search history.

(56) References Cited

U.S. PATENT DOCUMENTS 6,970,426 B1   11/2005  Haddock et al.
2002/0107908 A1   8/2002  Dharanikota et al.
(Continued)

FOREIGN PATENT DOCUMENTS

EP    1220493 A1    7/2002
EP    2317701 A1    5/2010
(Continued)

OTHER PUBLICATIONS

Santitoro 1, "Metro Ethernet Services—A Technical Overview," 2003, Metro Ethernet Forum, http://www.mef.net/Assets/White_Papers/Metro-Ethernet-Services.pdf, all pages.*

(Continued)

*Primary Examiner* — Kwang B Yao
*Assistant Examiner* — Adam Duda
(74) *Attorney, Agent, or Firm* — Murphy, Bilak & Homiller, PLLC

(57) ABSTRACT

A method of prioritizing packets for delivery over a transport network, where a guaranteed minimum information rate over the transport network is specified. The method comprises, for each bearer to be injected into the transport network from the mobile network, specifying a bearer information rate and marking packets up to that rate as conformant with the bearer information rate, and marking packets exceeding that rate as non-conformant. Multiple traffic-type streams from the mobile network are converged, each traffic-type stream comprising multiple bearers. Packets of traffic-type streams are inspected to identify packets marked as conformant and non-conformant, and at least a fraction of non-conformant packets are re-marked as conformant if the converged rate of conformant packets is less than said minimum information rate. The transport network prioritizes delivery of packets marked as conformant over those packets marked as non-conformant.

20 Claims, 3 Drawing Sheets

(56) References Cited

U.S. PATENT DOCUMENTS

| | | | |
|---|---|---|---|
| 2004/0052212 | A1 | 3/2004 | Baillargeon |
| 2005/0135378 | A1 | 6/2005 | Rabie |
| 2005/0232150 | A1 | 10/2005 | Nishimura et al. |
| 2006/0176818 | A1 | 8/2006 | Olsen et al. |
| 2006/0187827 | A1* | 8/2006 | Smith ............... H04L 47/10 370/229 |
| 2006/0187839 | A1 | 8/2006 | Smith et al. |
| 2006/0215558 | A1 | 9/2006 | Chow et al. |
| 2008/0095049 | A1 | 4/2008 | Bugenhagen et al. |
| 2008/0155087 | A1 | 6/2008 | Blouin et al. |
| 2009/0245104 | A1 | 10/2009 | Nishimura et al. |
| 2010/0061260 | A1 | 3/2010 | Bugenhagen et al. |
| 2010/0135229 | A1* | 6/2010 | Lohr et al. ........ H04W 72/1284 370/329 |
| 2010/0322072 | A1 | 12/2010 | Fujihira et al. |
| 2011/0158101 | A1 | 6/2011 | Figueira |
| 2012/0195326 | A1 | 8/2012 | Krzanowski et al. |
| 2014/0286169 | A1 | 9/2014 | Gunduzhan et al. |
| 2014/0293793 | A1* | 10/2014 | Racz ............... H04W 28/0268 370/235 |
| 2014/0301195 | A1* | 10/2014 | Briscoe ............ H04L 47/828 370/230.1 |

FOREIGN PATENT DOCUMENTS

| | | | |
|---|---|---|---|
| WO | 2007078404 | A1 | 7/2007 |
| WO | 2008049425 | A1 | 5/2008 |
| WO | 2008055936 | A1 | 5/2008 |
| WO | 2013053403 | A9 | 4/2013 |
| WO | 2013053404 | A1 | 4/2013 |

OTHER PUBLICATIONS

Santitoro 2, "Metro Ethernet Services—A Technical Overview," 2004, Metro Ethernet Forum, https://www.mef.net/Assets/White_Papers/Bandwidth-Profiles-for-Ethernet-Services.pdf, all pages.*
IEEE, "Virtual Bridged Local Area Networks—Amendment 4: Provider Bridges", IEEE P802.1ad/D2.4, Draft Standard for Local and Metropolitan Area Networks, Sep. 27, 2004, 1-129.
Unknown, Author, "Carrier Ethernet Class of Service—Phase 1", The Metro Ethernet Forum, MEF 23, Implementation Agreement, 1-41, Jun. 10, 2009.
3GPP, "3rd Generation Partnership Project; Technical Specification Group Core Network and Terminals; Domain Name System Procedures; Stage 3 (Release 9)", 3GPP TS 29.303 V9.2.0, Sep. 2010, 1-51.
3GPP, "3rd Generation Partnership Project; Technical Specification Group Core Network and Terminals; Numbering, addressing and identification (Release 9)", 3GPP TS 23.003 V9.4.0, Sep. 2010, 1-76.
Heinanen et al. "A Two Rate Three Color Marker." The Internet Society. Network Working Group. Request for Comments 2698. University of Pennsylvania. Sep. 1999. 1-6.
Unknown, Author. "Ethernet Service Characteristics." G.8011 Version 3 Draft. Telecommunication Standardization Sector of ITU. Chengdu. Sep. 2011. 1-40.
Santitoro, R., "Bandwidth Profiles for Ethernet Services," Annual Review of Communications. National Engineering Consortium; XP-001520497; Jan. 1, 2005. pp. 349-355. vol. 58. Chicago, Illinois, US.
3GPP. "3rd Generation Partnership Project; Technical Specification Group Services and System Aspects; General Packet Radio Service (GPRS) enhancements for Evolved Universal Terrestrial Radio Access Network (E-UTRAN) access (Release 10)." 3GPP TS 23.401 V10.5.0. Sep. 2011. 1-282.

* cited by examiner

OPTIMISED PACKET DELIVERY ACROSS A TRANSPORT NETWORK

TECHNICAL FIELD

The present invention relates to the optimised delivery of packets across a transport network. It is applicable in particular to the case where the transport network is a network used to deliver packets between nodes of a mobile (cellular) network operator.

BACKGROUND

A transport network (TN) is used to carry data signals between a Radio Base Station (RBS), such as a NodeB or an eNodeB in 3G Long-Term Evolution (LTE) networks, and a Serving gateway (S-GW) or Packet Data Network gateway (PDN-GW). With the rapid growth of digital data telecommunications following the introduction of 3G and 4G technology, TNs, or more specifically nodes within TNs, may become the bottlenecks in the overall data transport process. This presents a problem for operators as a Service Level Agreement (SLA) between two operators (the TN operator and the mobile network operator) will likely specify a guaranteed minimum quality of service for the TN. Thus, various systems and methods have been proposed for improving or prioritising the way that data packets are transported across the TN.

A favoured candidate for the TN architecture is the so-called Metro Ethernet, due to its reliability and the ready availability of network components and interfaces. In the Metro Ethernet Forum (MEF), a coloring concept is defined in MEF 23, Carrier Ethernet Class of Service—Phase 1. In this scheme, packets for transport across the TN are assigned a color (green, yellow, or red) according to whether they are conformant with the bandwidths as specified in a Service Level Agreement (SLA) established between two operators. In the case of the Metro Ethernet, minimum bandwidths may be specified in terms of a Committed Information Rate (CIR, or green rate) and an Excess Information Rate (EIR, or yellow rate, that is the maximum acceptable rate).

Identification of color can be used to indicate which service packets are deemed to be within or outside of the contract according to the bandwidth profile. Levels of compliance are green when fully compliant, yellow when sufficient compliance for transmission but without performance objectives, and red or discarded when not compliant with either. To take account of the coloring of packets, at a bottleneck point within a TN, a color aware active queue management process discards yellow packets in preference to green packets.

For packets arriving at in injection point to the TN (where the injection point has access to and enforces the SLA) and which do not already have a color assigned to them, the injection point will assign a color, green or yellow, to them according to the available bandwidth and the SLA. A "green bucket" is replenished with green tokens at the green rate (CIR). Similarly, a "yellow bucket" is replenished with yellow tokens at the yellow rate (EIR). A packet arriving at the injection point at a point in time when there are sufficient tokens present in the green bucket is colored green and sent over the TN (with an appropriate number of tokens being extracted from the green bucket). On the other hand, if at that point in time there are insufficient tokens in the green bucket but there are sufficient packets in the yellow bucket, the packet is colored yellow and sent over the TN (with an appropriate number of tokens being extracted from the yellow bucket). If there are insufficient tokens in both the green and yellow buckets, the packet is colored red and discarded.

In some cases, the mobile network operator may pre-color packets green or yellow. At the injection point into the TN, a color aware profiler checks whether sufficient capacity exists for the received green and yellow packets (by inspecting the green or yellow bucket as appropriate). If sufficient capacity is available, the packets are sent over the TN with their colors unchanged. If sufficient capacity is not available, green packets may be re-colored yellow or red, and yellow packets may be re-colored red. Packets that are re-colored as red are dropped by the profiler (an appropriate retransmission mechanism is typically employed to cause redelivery of the dropped packets).

It is noted that the IEEE 802.1ad standard introduced a Drop Eligibility bit in VLAN tagged Ethernet frames (Virtual Bridged Local Area Networks Amendment 4: Provider Bridges, IEEE 802.1ad). The DEI bit is mandatory in service VLAN tagged frames and optional for customer VLAN tagged frames. The DEI bit provides a possible option to mark packets as green or yellow.

Pre-coloring of packets by the mobile network operator allows that operator to easily verify conformance of the TN operator with the SLA. The coloring concept can also be used to improve per-service fairness. Clients (UEs) making use of the mobile network service will typically establish a bearer to some gateway node, e.g. RNC in the case of 3G and S-GW in the case of LTE, for each session that they are engaged in. These bearers will be transported across the TN. The mobile network operator may wish to apply different TN rates and qualities to different session types. For example, the mobile network operator may wish bearers associated with voice calls to be sent over the TN with a relatively high rate and quality, whilst it may wish to transport bearers associated with P2P services (e.g. file sharing) with a relatively low rate and quality. This is possible by allowing the mobile network operator to define a green rate for an individual bearer. Packets on this bearer are colored green up to that green rate. Above the green rate, packets are colored yellow. Thus, for example, the green rate on a voice call bearer may be set low relative to the green rate set for a P2P bearer. The color aware profiler at the TN injection point will tend to send green packets over the TN in preference to yellow packets. Of course, the sum of the green rates for all bearers should not exceed the green rate specified by the SLA, i.e. the CIR.

In some cases, the TN injection point may implement a so-called color blind profiler. Such a profiler takes no account of any pre-coloring of the packets, and merely colors packets according to the SLA. In the case where pre-coloring is intended to improve "fairness" between different bearers, the color blind profiler does not achieve this. In the case where the profiler is color aware profiler, it is typically not possible for yellow packets to be changed to green. In this case it is possible that yellow packets will be injected into the TN when there remains capacity (according to the SLA) for green packets. The TN network is permitted to drop the yellow packets. Thus, a method intended to improve fairness between bearers has the result of unnecessarily reducing bearer transmission rate and quality across the TN.

SUMMARY

According to a first aspect of the present invention there is provided a method of prioritising packets for delivery over a transport network interconnecting nodes of a mobile network, where a guaranteed minimum information rate over the transport network is specified for the mobile network. The method comprises, for each bearer to be injected into the transport network from the mobile network, specifying a bearer information rate and marking packets up to that rate as conformant with the bearer information rate and marking packets exceeding that rate as non-conformant with the bearer information rate. A plurality of traffic type streams from the mobile network are converged, each traffic type stream comprising a plurality of bearers. Packets of the converged traffic type streams are inspected to identify packets marked as conformant and non-conformant, and re-marking non-conformant packets, or at least a fraction of non-conformant packets, as conformant if the converged rate of conformant packets is less than said minimum information rate. The transport network prioritises the delivery of packets marked as conformant over those packets marked as non-conformant.

Embodiments of the present invention may allow the transport network to optimise the delivery of mobile network originating traffic, such that bandwidth wastage over the transport network is reduced.

The transport network may be a Metro Ethernet network, and said marking of packets as conformant or non-conformant is consistent with the specified Ethernet Class of service for Metro Ethernet such that conformant packets are colored "green" and non-conformant packets are colored yellow.

The method may comprise maintaining a token "bucket" in a memory device and filling the bucket with tokens at said minimum information rate, tokens being deducted from the bucket upon sending of a packet, marked or re-marked as conformant, across the transport network. The method further comprises defining a bucket fill threshold for each traffic type stream and, for a given packet of a given stream marked as non-conformant, re-marking that packet as conformant if the bucket fill level exceeds the bucket fill level defined for the associated traffic type stream.

The method may comprise maintaining a first token "bucket" in a memory device and filling the bucket with tokens at said minimum information rate, and maintaining second token buckets in a memory device, for each of the traffic type streams, and filling the second token buckets with tokens overflowing from the first token bucket. For packets of the converged traffic stream types that are marked as conformant, that marking is maintained if there are sufficient tokens in the first and second buckets and an appropriate number of tokens deducted from the bucket(s), and for each packet marked as non-conformant, the packets are re-marked as conformant only if there are sufficient tokens in the second bucket associated with the traffic type stream to which the packet belongs.

According to a second aspect of the present invention there is provided apparatus for interconnecting nodes of a mobile network to a transport network, where a minimum information rate over the transport network is specified for the mobile network. The apparatus comprises a plurality of first interfaces coupled to said mobile network for receiving therefrom respective traffic type flows, a second interface coupled to said transport network for sending a converged traffic stream towards said transport network, and a packet handler for inspecting packets of the incoming traffic type streams to identify packets marked as conformant and non-conformant, and for re-marking non-conformant packets, or at least a fraction of non-conformant packets, as conformant if a converged rate of conformant packets is less than said minimum information rate. The transport network prioritises the delivery of packets marked as conformant over those packets marked as conformant.

DETAILED DESCRIPTION OF PREFERRED EMBODIMENTS

As has been discussed above, in the case where a mobile network operator allocates green rates on a per bearer basis in order to improve the fairness with which the bearers are sent over a Transport Network (TN), it is possible that a color aware profiler implemented at the TN injection point will inject packets at a rate below the minimum rate guaranteed by the Service Level Agreement (SLA) implemented between the TN operator and the mobile network operator (nb. A "bearer" here can be defined as an association between the mobile equipment and a network node, e.g. RNC and SGW/PGW).

To address these issues it is proposed here that, at the injection point to the TN, pre-colored yellow packets may be changed to green when sufficient capacity exists according to the SLA. This will tend to increase the utilization of the CIR for the mobile network operator. Of course, this concept can be used at other points in the network, not only where the SLA is enforced.

Figure 1:
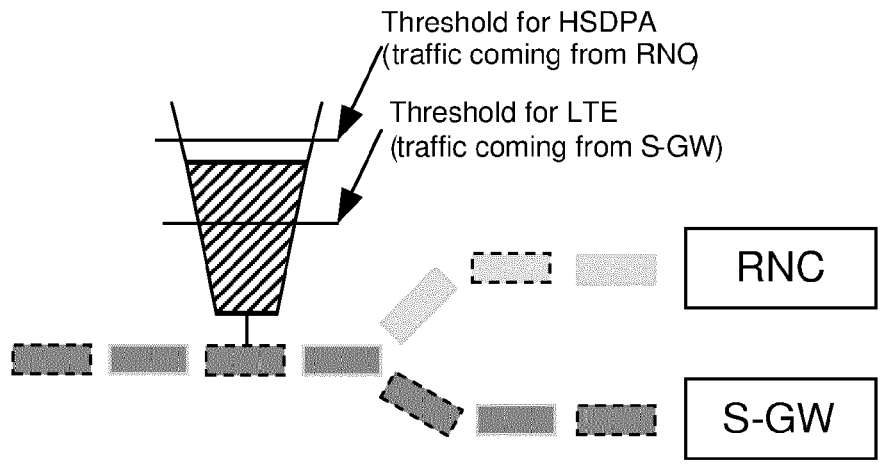
FIG. 1 illustrates schematically a procedure for prioritising packets for sending over a Transport Network and which allows for re-coloring of packets, arriving from a mobile network, at an injection point to the transport network.

FIG. 1 illustrates schematically the basic concept of the proposed solution. In this example, the TN injection point receives two different traffic types associated with the same mobile network and therefore with the same SLA, namely HSDPA traffic coming from an RNC, and LTE traffic coming from a S-GW. Each traffic flow will be composed of a plurality of individual bearers, with each bearer typically being allocated to a given session at a given client or UE. As has been discussed above, the mobile network operator will allocate a green rate to each bearer and will pre-color packets in that bearer as green or yellow depending upon the current transfer rate and the allocated green rate. This pre-coloring may be carried out at the S-GW (or PDN-GW) in the case of the LTE flow and at the RNC in the case of the HSDPA flow.

A bucket fill threshold value is assigned to each incoming traffic type. For both traffic types, green packets are sent out as green if there are sufficient tokens in the green bucket. For each yellow packet of each traffic type, if the token fill level in the green bucket is above the associated threshold (and there are enough tokens for that packet) then an incoming yellow packet from that traffic type is re-colored to green. If not, then the packet remains yellow. By appropriately setting the different thresholds it is possible to achieve a desired distribution of unused green token between the different traffic types (in this example between LTE and HSDPA). For example, if threshold for LTE is set to a level lower than that for HSDPA, preference is given in the TN to LTE traffic over HSPDA traffic.

The approach of FIG. 1 assumes of course that there is an unlimited supply of tokens in the yellow bucket. In practice, assuming a single yellow bucket is employed without any thresholds to differentiate between traffic types, a packet that is pre-colored yellow will only remain yellow and be sent if there are sufficient tokens in the yellow bucket. Otherwise, it will be colored red and discarded. It is possible that different yellow bucket thresholds may be defined for the different traffic types in order to differentiate between traffic types when it comes to the handling of yellow packets. It is also possible that no yellow bucket is implemented at the injection point.

Figure 2:
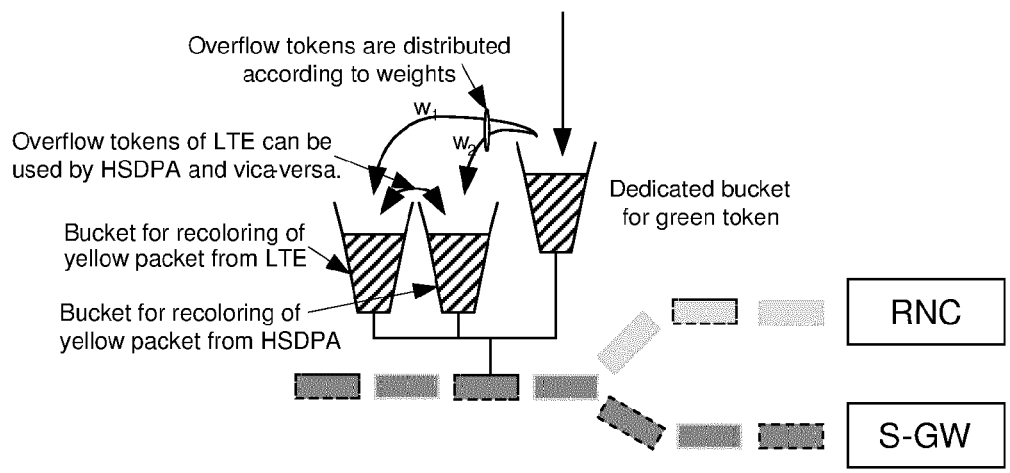
FIG. 2 illustrates schematically an enhanced procedure compared with that of FIG. 1.

FIG. 2 illustrates schematically a more sophisticated algorithm for implementation at a color aware profiler of a TN injection point, assuming again that the injection point receives two traffic streams from the mobile network, namely a HSDPA traffic flow and a LTE traffic flow. Considering the handling of incoming packets that are pre-colored green and yellow (by the mobile operator), three different buckets are employed, namely:

1. A bucket "X" dedicated for packets that are pre-colored green. Tokens in this bucket are allocated only to packets that are pre-colored green, (i.e. these tokens are not used to recolor yellow packets).
2. A bucket "Y" for recoloring of LTE packets. Tokens in this bucket can be used for recoloring yellow LTE packets (into green), and can also be allocated to pre-colored green packet.
3. A bucket "Z" for recoloring of HSDPA packets. Tokens in this bucket can be used use for recoloring yellow HSDPA packets (into green), and can also be allocated to pre-colored green packet.

Considering now the implementation of the process, the dedicated green bucket X is refilled with green tokens at the green (SLA defined) rate, i.e. the CIR. When this bucket overflows (according to some predefined overflow limit), then the overflowing tokens are distributed between the two other buckets Y and Z in a weighted manner. For example $w_1/(w_1+w_2)$ fraction of the overflowing tokens are placed in bucket Y (LTE) and the remaining tokens are placed in bucket Z (HSDPA). If bucket Y in turn overflows, then the overflowing tokens are placed into bucket Z, and vice versa.

Consider now an incoming packet that is pre-colored green. If the total number of green tokens across all three bucket is sufficient to accommodate the packet size, the packet color remains green. Tokens are taken from the different buckets depending upon how the rules are set up. One option is to take tokens first from bucket Y and Z. If this provides insufficient tokens, then additional tokens are taken from bucket X. If there are insufficient tokens across all of the buckets, then the packet is re-colored to yellow. This approach tends to prioritise pre-colored green packets over the re-coloring process for yellow packets (yellow to green).

An incoming pre-colored yellow packet (i.e. originally yellow packet) is re-colored to green only when there are enough tokens in the associated re-coloring bucket. So, if the packet is within the LTE traffic flow and if sufficient tokens are available within bucket Y, packets are taken from this bucket and the packet re-colored green. If there are insufficient tokens with bucket Y, the packet remains yellow. Tokens from the other buckets, X and Z, are not used.

The approach described here provides a simple yet efficient mechanism for sharing the SLA agreed CIR between different traffic flows. It avoids the need to inspect packets at the (bottleneck) TN nodes to distinguish between packets of different traffic flows. Rather, an active queue management process at a TN bottleneck node can use the color information marked in the data packets when choosing which packets to drop when there is insufficient bandwidth (congestion). The first packets to be dropped will be the yellow packets.

Considering further the per-bearer level pre-coloring performed by the mobile network operator, in the case of LTE this may be done in the PDN-GW (rather than in the S-GW). From the PDN-GW, the packets go to the S-GW and from the S-GW to the TN via the TN injection node. If the PDN-GW and the S-GW are connected by an Ethernet connection, then the PDN-GW can use the DEI bit of the Ethernet frame (packet) to signify the color assigned to the packet. The S-GW reads out the DEI bit of incoming packets and when these packets leave the S-GW towards TN, the DEI bits of the outgoing packets are set accordingly. Alternatively, if the DSCP field of the IP packet is used to signify the color assigned to the packet at the PDN-GW, then the S-GW reads out the value in the DSCP field and uses it to fill in the DEI bit of the outgoing Ethernet frames sent to the TN.

In the case of HSDPA or a common TN (common between LTE and HSDPA). It can also be applied to TNs operating with multiple RBSs (e.g. NodeBs and eNodeBs) sharing the same TN bottleneck. For this common transport there is no requirement for any direct communication between nodes. Each node may be provided with a separate 'green' rate table (see below) or the green rates may be harmonized across the different technologies and nodes. For example a Bearer serving a given service may always get (e.g.) a 1 Mbps 'green' rate independently whether it uses LTE or HSDPA.

Figure 3:
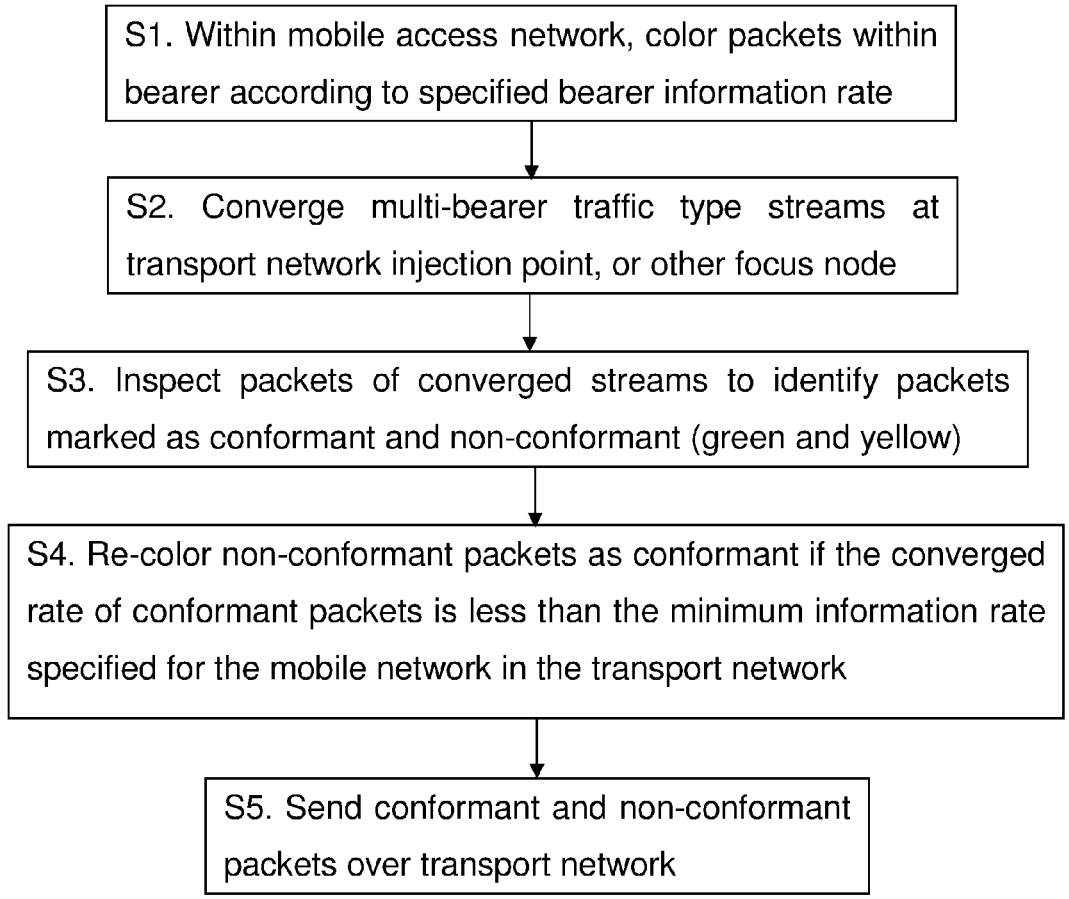
FIG. 3 is a flow diagram illustrating a generic procedure in line with that of FIGS. 1 and 2.

FIG. 3 illustrates by way of a flow diagram a procedure for prioritizing packets for delivery over a transport network. At step S1, packets are colored within the mobile network according to a per bearer coloring algorithm. At step S2, multiple streams are merged at a transport network injection point. Packets are inspected at the injection point, step S3, to determine whether they are marked as conformant or non-conformant. Then, at step S4, if capacity is determined to be available on the transport network, non-conformant packets arriving from the mobile network (yellow) may be marked as conformant (green). At step S5, packets are sent over the transport network, marked or re-marked as conformant or non-conformant.

Figure 4:
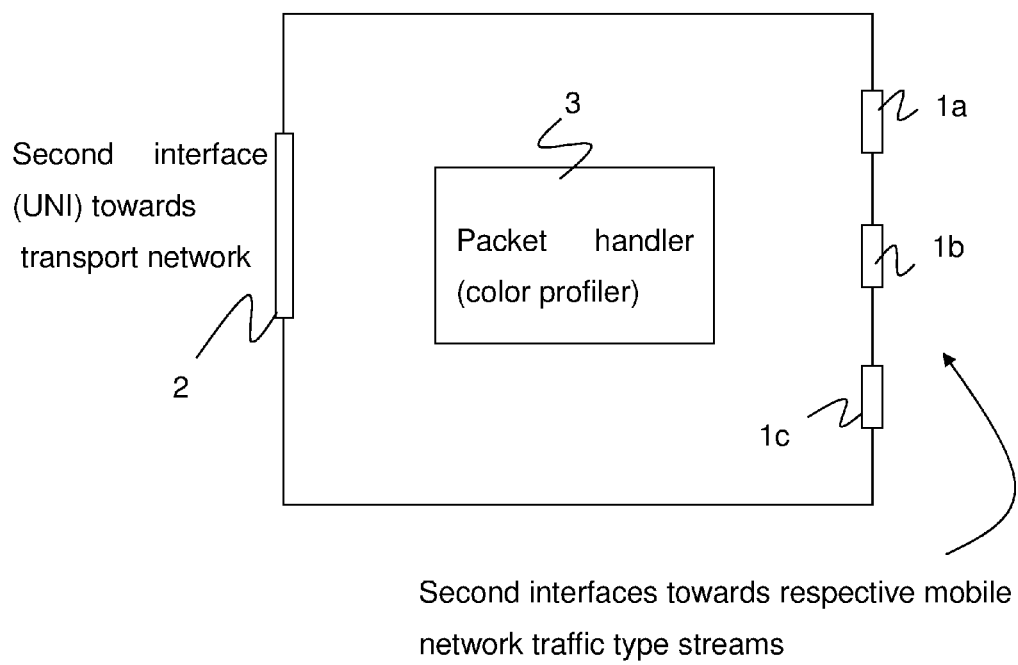
FIG. 4 illustrates schematically apparatus for injecting packets into a transport network and which allows for the re-coloring of pre-colored packets.

Referring now to FIG. 4, this illustrates a node for injecting packets into a transport network, either directly or via some intermediate nodes and/or networks. The node comprises a plurality of first interfaces 1a, 1b, 1c coupled to a mobile network for receiving therefrom respective traffic type flows. A second interface 2 is provided and is coupled to the transport network for sending a converged traffic stream towards the transport network. A packet handler 3 inspects packets of the incoming traffic type streams to identify packets marked as conformant and non-conformant, and re-marks non-conformant packets, or at least a fraction of non-conformant packets, as conformant if a converged rate of conformant packets is less than said minimum information rate. The transport network prioritises the delivery of packets marked as conformant over those packets marked as conformant.

It will be appreciated by the person of skill in the art that various modifications may be made to the above described embodiment without departing from the scope of the present invention.

The invention claimed is:

1. A method of prioritizing packets for delivery over a transport network interconnecting nodes of a mobile network, where a guaranteed minimum information rate over the transport network is specified for the mobile network, the method comprising:

for each bearer to be injected into the transport network from the mobile network, specifying a bearer information rate and marking packets up to that rate as conformant with the bearer information rate and marking packets exceeding that rate as non-conformant with the bearer information rate;

converging a plurality of traffic type streams from the mobile network, each traffic type stream comprising a plurality of bearers;

maintaining a token "bucket" in a memory device and filling the bucket with tokens at said minimum information rate;

defining a bucket fill threshold for each traffic type stream;

inspecting packets of the converged traffic type streams to identify packets marked as conformant and non-conformant, and for a given packet of a given stream marked as non-conformant, re-marking that packet as conformant if the bucket fill level exceeds the bucket fill threshold defined for the associated traffic type stream; and deducting tokens from the bucket upon sending of a packet, marked or re-marked as conformant, across the transport network, wherein said transport network prioritizes the delivery of packets marked as conformant over those packets marked as non-conformant.

2. The method of claim 1, wherein said transport network is a Metro Ethernet network, and said marking of packets as conformant or non-conformant is consistent with the specified Ethernet Class of service for Metro Ethernet such that conformant packets are colored "green" and non-conformant packets are colored "yellow".

3. The method of claim 2, wherein said steps of converging a plurality of traffic type streams and inspecting packets of the converged traffic type streams are carried out at an Ethernet User Network Interface (UNI) that interconnects the mobile network to the transport network.

4. The method of claim 2, wherein said step of marking packets up to the minimum information rate as conformant with the bearer information rate and marking packets exceeding that rate as non-conformant with the bearer information rate is carried out at nodes within the mobile network handling the respective traffic type streams.

5. The method of claim 4, wherein at least one of said traffic type streams is a LTE traffic stream, and said step of marking packets is carried out at one of a S-GW and a PDN-GW.

6. The method of claim 4, wherein at least one of said traffic type streams is a HSDPA traffic stream, and said step of marking packets is carried out at an RNC.

7. The method of claim 1, further comprising assigning relative priorities to the traffic type streams and filling the second buckets with tokens overflowing from the first bucket in dependence upon the associated priorities.

8. A method of prioritizing packets for delivery over a transport network interconnecting nodes of a mobile network, where a guaranteed minimum information rate over the transport network is specified for the mobile network, the method comprising:

for each bearer to be injected into the transport network from the mobile network, specifying a bearer information rate and marking packets up to that rate as conformant with the bearer information rate and marking packets exceeding that rate as non-conformant with the bearer information rate;

converging a plurality of traffic type streams from the mobile network, each traffic type stream comprising a plurality of bearers;

maintaining a first token "bucket" in a memory device and filling the bucket with tokens at said minimum information rate;

maintaining second token buckets in a memory device, for each of the traffic type streams, and filling the second token buckets with tokens overflowing from the first token bucket;

inspecting packets of the converged traffic type streams to identify packets marked as conformant and non-conformant, and for packets of the converged traffic stream types that are marked as conformant, maintaining that marking if there are sufficient tokens in the first and second buckets and deducting an appropriate number of tokens from the bucket(s), and for each packet marked as non-conformant, re-marking the packets as conformant only if there are sufficient tokens in the second bucket associated with the traffic type stream to which the packet belongs, wherein said transport network prioritizes the delivery of packets marked as conformant over those packets marked as non-conformant.

9. The method of claim 8, wherein said transport network is a Metro Ethernet network, and said marking of packets as conformant or non-conformant is consistent with the specified Ethernet Class of service for Metro Ethernet such that conformant packets are colored "green" and non-conformant packets are colored "yellow".

10. The method of claim 9, wherein said steps of converging a plurality of traffic type streams and inspecting packets of the converged traffic type streams are carried out at an Ethernet User Network Interface (UNI) that interconnects the mobile network to the transport network.

11. The method of claim 9, wherein said step of marking packets up to the minimum information rate as conformant with the bearer information rate and marking packets exceeding that rate as non-conformant with the bearer information rate is carried out at nodes within the mobile network handling the respective traffic type streams.

12. The method of claim 11, wherein at least one of said traffic type streams is a LTE traffic stream, and said step of marking packets is carried out at one of a S-GW and a PDN-GW.

13. The method of claim 11, wherein at least one of said traffic type streams is a HSDPA traffic stream, and said step of marking packets is carried out at an RNC.

14. The method of claim 8, further comprising assigning relative priorities to the traffic type streams and filling the second buckets with tokens overflowing from the first bucket in dependence upon the associated priorities.

15. An apparatus for interconnecting nodes of a mobile network to a transport network, where a minimum information rate over the transport network is specified for the mobile network, the apparatus comprising:

a plurality of first interfaces coupled to said mobile network for receiving therefrom respective traffic type flows;

a second interface coupled to said transport network for sending a converged traffic stream towards said transport network; and a packet handler for inspecting packets of the incoming traffic type streams to identify packets marked as conformant and non-conformant, and comprising a memory device maintaining a token "bucket" having a fill threshold for each traffic type stream, the packet handler filling the bucket with tokens at said minimum information rate and, for a given packet of a given stream marked as non-conformant, re-marking that packet as conformant if the bucket fill level exceeds the bucket fill threshold defined for the associated traffic type stream;

wherein said transport network prioritizes the delivery of packets marked as conformant over those packets marked as conformant.

16. The apparatus of claim 15, wherein said transport network is a Metro Ethernet and said second interface is an Ethernet User-Network Interface (UNI).

17. The apparatus of claim 16, wherein said packet handler is configured to re-mark packets consistent with the specified Ethernet Class of service for Metro Ethernet such that conformant packets are colored "green" and non-conformant packets are colored "yellow".

18. An apparatus for interconnecting nodes of a mobile network to a transport network, where a minimum information rate over the transport network is specified for the mobile network, the apparatus comprising:
- a plurality of first interfaces coupled to said mobile network for receiving therefrom respective traffic type flows;
- a second interface coupled to said transport network for sending a converged traffic stream towards said transport network; and
- a packet handler for inspecting packets of the incoming traffic type streams to identify packets marked as conformant and non-conformant, comprising a memory device maintaining a first token "bucket" the packet handler filling the first token bucket with tokens at said minimum information rate and maintaining second token buckets for each of the traffic type streams, the packet handler filling the second token buckets with tokens overflowing from the first token bucket;
- wherein, for packets of the converged traffic stream types that are marked as conformant the packet handler maintains that marking if there are sufficient tokens in the first and second buckets and deducts an appropriate number of tokens from the bucket(s), and for each packet marked as non-conformant, the packet handler re-marks the packets as conformant only if there are sufficient tokens in the second bucket associated with the traffic type stream to which the packet belongs, and
- wherein said transport network prioritizes the delivery of packets marked as conformant over those packets marked as conformant.

19. The apparatus of claim 18, wherein said transport network is a Metro Ethernet and said second interface is an Ethernet User-Network Interface (UNI).

20. The apparatus of claim 19, wherein said packet handler is configured to re-mark packets consistent with the specified Ethernet Class of service for Metro Ethernet such that conformant packets are colored "green" and non-conformant packets are colored "yellow".

\* \* \* \* \*

UNITED STATES PATENT AND TRADEMARK OFFICE
CERTIFICATE OF CORRECTION

PATENT NO. : 9,319,323 B2  
APPLICATION NO. : 14/350109  
DATED : April 19, 2016  
INVENTOR(S) : Rácz et al.

Page 1 of 1

It is certified that error appears in the above-identified patent and that said Letters Patent is hereby corrected as shown below:

Title page, item (75), under "Inventors", in Column 1, Line 2, delete "HI (US);" and insert -- (HU); --, therefor.

In the Specification

In Column 1, Line 31, delete "Ethernet," and insert -- Ethernet --, therefor.

In Column 1, Line 33, delete "(MEF)," and insert -- (MEF) --, therefor.

Signed and Sealed this  
Nineteenth Day of July, 2016

Michelle K. Lee  
*Director of the United States Patent and Trademark Office*